United States Patent [19]

Latham

[11] 4,214,763

[45] Jul. 29, 1980

[54] BORE SEAL

[76] Inventor: Raymond E. Latham, 231 Tamerlaine, Houston, Tex. 77024

[21] Appl. No.: 953,406

[22] Filed: Oct. 23, 1978

[51] Int. Cl.² ............................................ F16L 23/00
[52] U.S. Cl. ................................ 277/167.5; 277/236; 285/336
[58] Field of Search ................ 277/167.5, 168–172, 277/190, 236, 102; 285/336, 363

[56] References Cited

U.S. PATENT DOCUMENTS

| 2,761,707 | 9/1956 | Herman | 277/101 |
| 3,208,758 | 9/1965 | Carlson et al. | 285/336 |
| 3,479,063 | 11/1969 | Rauer | 277/167.5 |
| 3,749,426 | 7/1973 | Tillman | 285/336 |
| 3,873,105 | 3/1975 | Wehner | 277/171 |
| 3,989,285 | 11/1976 | Yancey | 277/236 |

FOREIGN PATENT DOCUMENTS 4635801 2/1968 Japan ........................... 277/167.5

Primary Examiner—Robert I. Smith
Attorney, Agent, or Firm—Bill B. Berryhill

[57] ABSTRACT

An annular bore seal for sealing between connected first and second coaxially aligned members, each of which is provided with an internal frusto-conical seating surface tapering inwardly from their adjoining ends. The seal comprises: an inner cylindrical surface; annular end surfaces at opposite ends thereof; frusto-conical outer sealing surfaces adjacent each of the end surfaces and tapering outwardly therefrom; an outer alignment ring surface midway between the end surfaces; and annular relieved areas between the alignment ring surface and the frusto-conical sealing surfaces.

11 Claims, 2 Drawing Figures

BORE SEAL

BACKGROUND OF THE INVENTION

1. Field of the Invention

The present invention pertains to fluid seals. More specifically, it pertains to annular seals for sealing the connection between coaxially aligned members. Still more specifically, it pertains to bore seals of the flexible pressure-energized type.

2. Brief Description of the Prior Art

There are many types of seals or gaskets for sealing between flanges or in other types of connectors. These seals may be broadly categorized as those that seal on the face of the connector and those that seal on the bore. In both categories, sealing may be achieved by crushing or yielding the gasket; by elastically loading a flexible gasket utilizing a soft coating or plating on the seal surface; or by a combination of both. The seals may or may not be pressure energized as dictated by their geometry and location in the connector.

Because of their relatively massive cross-sections, some bore seals require considerably more bolt up loading than do face seals. On the other hand, bore seals may be more economic because of lower manufacturing tolerances. In addition, most bore seals are self-centering, whereas face seals are generally extremely sensitive to misalignment. Flexible bore seals are particularly adaptable to high temperature use because they are radially compressed during make-up, resulting in residual seal loading.

An extremely popular bore seal of the past few years is one which comprises a flange portion having oppositely disposed flexible lips and a centrally disposed rib portion. The lips are provided with annular seating surfaces which taper outwardly toward the rib portion. Examples of this type of bore seal may be seen in U.S. Pat. Nos. 2,766,829; 2,766,998; 2,766,999; and 3,325,176. While this type of seal is basically a bore seal, it has some of the characteristics of a face seal, due to the rib portion which is normally disposed between the end faces of the connectors with which it is used. Consequently, it requires higher manufacturing tolerances and is more expensive to manufacture than some bore seals.

SUMMARY OF THE INVENTION

The seal of the present invention is a flexible type bore seal. It is also a pressure energized seal. It is primarily designed for sealing between connected first and second coaxially aligned members, such as flanges, each of which may be provided with an internal frusto-conical seating surface tapering inwardly from the adjoining ends thereof. The surfaces of the seal may comprise: an inner cylindrical surface; annular end surfaces at opposite ends thereof; frusto-conical outer sealing surfaces adjacent each of the end surfaces tapering outwardly therefrom; and an outer alignment ring surface midway between the end surfaces. In addition, annular relieved areas may be provided between the alignment ring surface and the frusto-conical sealing surfaces.

Due to the alignment ring surface and the shoulders provided at the end surfaces of the seal, the seal is self-aligning. It requires relatively low bolt-up loading. It has a predetermined sealing area and consequently a predetermined load. It is pressure-energized so that any increase in pressure internally of the connected members results in greater sealing forces. It provides a smooth bore eliminating turbulence and the erosion and corrosion associated therewith. In addition, it is reusable. Furthermore, it is less expensive to manufacture then bore seals of the aforementioned type having a centrally disposed rib portion. Many other objects and advantages of the seal of the present invention will be apparent from the description which follows in conjunction with the accompanying drawings.

DESCRIPTION OF A PREFERRED EMBODIMENT

Figure 1:
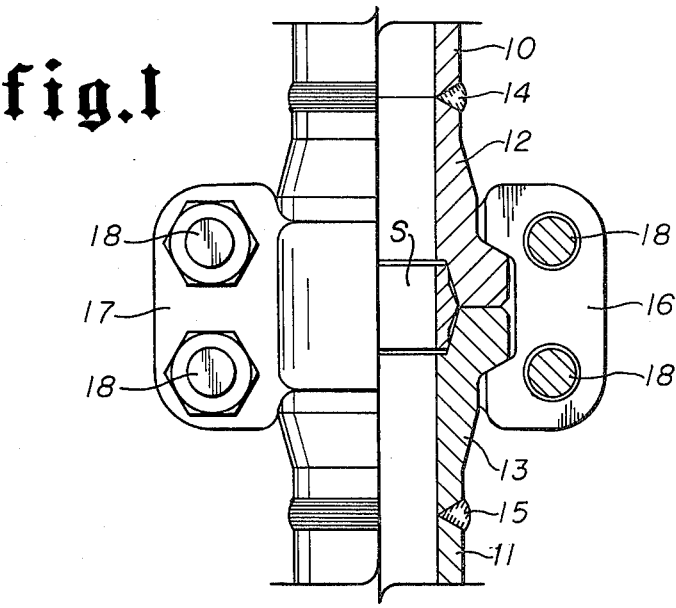
FIG. 1 is an elevation view, partially broken away and partially in section, showing a clamp-type connection utilizing a seal according to a preferred embodiment of the present invention.

Referring first to FIG. 1, there is shown coaxially aligned pipe sections 10 and 11 connected by a pair of flanges 12 and 13. The flanges 12 and 13 may be attached to the pipe sections 10 and 11 by welding, as at 14 and 15, or any other suitable means. The flanges 12 and 13 may be connected by bolts, clamps, or any other suitable means. As illustrated in FIG. 1, these flanges are held together by a clamp arrangement which includes a pair of "C" clamps 16 and 17 connected by bolts 18. Prior to connection, a bore seal S, according to a preferred embodiment of the invention, is placed in the bore of the flanges for sealing the connection therebetween.

Figure 2:
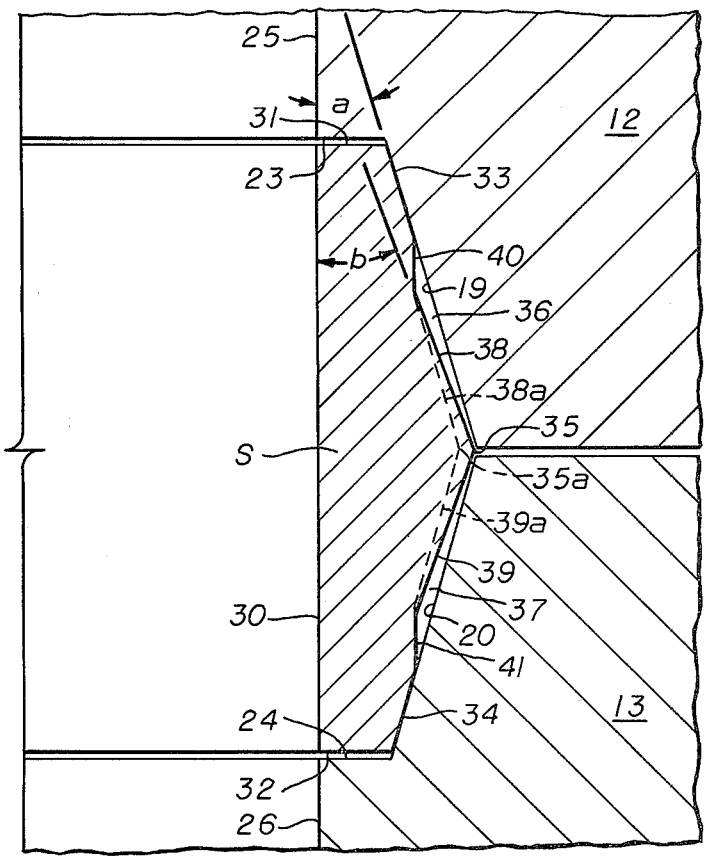
FIG. 2 is a detailed cross-sectional view of the seal of the present invention and its relationship with the pair of flange members shown in FIG. 1.

Referring now also to FIG. 2, each of the flanges 12 and 13 are provided with internal or frusto-conical seating surfaces 19 and 20, respectively, tapering inwardly from the adjoining end faces 21 and 22 of the flanges. The opposite ends of the frusto-conical seating surfaces 19 and 20 may terminate at annular shoulders 23 and 24 at the ends of flanges bores 25 and 26, respectively. The angle of taper between the axes of the flange members 12 and 13 and their respective frusto-conical seating surfaces 19 and 20, as illustrated at "a", is preferably in the range of 15° to 20°.

The surfaces of the seal member S include an inner cylindrical surface 30 and annular end surfaces 31 and 32 at the opposite ends thereof. The external surfaces include frusto-conical sealing surfaces 33 and 34 adjacent each of the end surfaces 31 and 32 and tapering outwardly therefrom at an angle substantially the same as the taper angle "a" of the flange seating surfaces 19 and 20.

The outer surfaces also include a ring surface 35 midway between the ends 31 and 32. As viewed in cross-section, as in FIG. 2, the ring surface 35 is actually a point. Annular relieved areas 36 and 37 are preferably provided between the alignment ring surface 35 and the frusto-conical sealing surfaces 33 and 34. These relieved areas 36 and 37 may be provided by machining other frusto-conical surfaces 38 and 39 adjacent the ring surface 35 which taper inwardly therefrom. These other frusto-conical surfaces 38 and 39 may be joined to the first-mentioned frusto-conical sealing surfaces 33 and 34 by cylindrical surfaces 40 and 41.

In the embodiment shown in FIG. 2, the outer alignment ring surface 35 substantially coincides with the circular intersection of the projection of frusto-conical sealing surfaces 33 and 34 when the seal member S is fully seated. Thus, the angle of taper "a" between the axis of the seal member S and the sealing surfaces 33 and 34 is less than the angle of taper "b" between the axis of the seal member S and the other frusto-conical surfaces 38 and 39. In an alternate embodiment, the other frusto-conical surfaces may be machined at the same taper angle "a" as the sealing surfaces 33 and 34 resulting in the configuration illustrated by dotted lines at 38a and 39a. In such a case, the alignment ring 35a, will be the intersection of frusto-conical surfaces 38a and 39a, rather than 33 and 34.

It is understood that as with other flexible type bore seals, the radial dimensions of the seal S, prior to installation, are greater than shown in FIG. 2. However, when the connection is properly made, the seal S assumes the position illustrated in FIG. 2. Since the areas of the sealing surfaces 33 and 34 are predetermined, the loading forces may also be predetermined. It is noted that the distance between the annular shoulders 23 and 24 of the respective flanges is slightly greater than the axial length of the seal member S. These shoulders 23 and 24, coupled with the end surfaces 31 and 32 of the seal member S and the alignment ring surface 35 result in self-alignment of the seal as the flanges 12 and 13 are clamped together.

It will also be noted that the diameter of the inner cylindrical surface 30 of the seal, when the flanges 12 and 13 are properly connected, is substantially the same as the adjoining bore diameters 25 and 26. This eliminates turbulence and the erosion and corrosion associated with such turbulence. Due to this bore configuration, the pressure internally of the connection exerts additional forces against the seal so that it is pressure-energized also.

Thus, it is seen that the flexible pressure-energized bore seal of the present invention is one which offers superior sealing and alignment characteristics. It is also easily and economically manufactured.

While a preferred embodiment and one alternate have been described herein, many variations of the invention can be made without departing from the spirit of the invention. Accordingly, it is intended that the scope of the invention be limited only by the claims which follow.

I claim:

1. An annular bore seal for sealing between connected first and second coaxially aligned and centrally bored members, each of which is provided with an internal frusto-conical seating surface tapering inwardly from the adjoining ends of said first and second members toward the bores thereof, said seal comprising:
   an inner cylindrical surface;
   annular end surfaces at opposite ends of said inner surface;
   frusto-conical outer sealing surfaces adjacent each of said end surfaces and tapering outwardly therefrom at an angle, with the axis of said seal, in the range of fifteen to twenty degrees;
   an outer alignment ring surface midway between said end surfaces defined by the circular intersection of a pair of cones whose axes coincide with said seal axis; and
   annular relieved areas between said alignment ring surface and said frusto-conical sealing surfaces.

2. An annular bore seal as set forth in claim 1 in which said outer alignment ring substantially coincides with the circular intersection of the projection of said frusto-conical sealing surfaces.

3. An annular bore seal as set forth in claim 1 in which the diameter of said alignment ring surface, when said first and second members are properly connected, is substantially the same as the major diameter of said frusto-conical seating surfaces.

4. An annular bore seal as set forth in claim 1 in which the angle of taper between the axis of said seal and said frusto-conical sealing surfaces is in the range of fifteen to twenty degrees.

5. An annular bore seal as set forth in claim 1 including other frusto-conical surfaces adjacent said ring surface tapering inwardly therefrom and at least partially providing said annular relieved areas.

6. An annular bore seal as set forth in claim 5 including cylindrical surfaces joining said frusto-conical sealing surfaces and said other frusto-conical surfaces to at least partially provide said annular relieved areas.

7. An annular bore seal as set forth in claim 5 in which the angle of taper between the axis of said seal member and said frusto-conical sealing surfaces is less than the angle of taper between said axis and said other frusto-conical surfaces.

8. An annular bore seal as set forth in claim 5 in which the angle of taper between the axis of said seal and said frusto-conical sealing surfaces is substantially the same as the angle of taper between said axis and said other frusto-conical surfaces.

9. An annular bore seal as set forth in claim 1 in which said frusto-conical seating surfaces of said first and second connected terminate at an annular shoulder formed internally of said connected members, the distance between the respective annular shoulders of said first and second connected members, when properly connected, being slightly greater than the axial length of said seal 10. An annular bore seal a set forth in claim 9 in which said inner bore surface of said seal forms a cylinder the diameter of which, when said first and second members are properly connected, is substantially the same as the adjoining bore diameter of said first and second members.

11. Fluid connection apparatus including first and second coaxially aligned and centrally bored members, each of which is provided with an internal frusto-conical seating surface tapering inwardly from the adjoining ends thereof; means for connecting said first and second members in said coaxial alignment; and an annular bore seal for sealing between said first and second members when connected, said annular bore seal comprising: an inner bore surface; annular end surfaces at opposite ends of said inner bore surface; frusto-conical outer sealing surfaces adjacent each of said end surfaces and tapering outwardly therefrom at an angle substantially the same as the taper angle of said frusto-conical seating surfaces of said first and second connected members; an outer alignment ring surface midway between said end surfaces defined by the circular intersection of a pair of cones whose axes coincide with the axis of said annular bore seal; and annular relieved areas between said alignment ring surface and said frusto-conical sealing surfaces.

* * * * *

UNITED STATES PATENT OFFICE
CERTIFICATE OF CORRECTION

Patent No. 4,214,763   Dated July 29, 1980

Inventor(s) Raymond E. Latham

It is certified that error appears in the above-identified patent and that said Letters Patent are hereby corrected as shown below:

Column 4, line 5, change "1" to --11--;

line 10, change "1" to -- 11 --;

line 32, change "1" to -- 11 --;

line 34, after "connected" insert -- members --.

Signed and Sealed this

Fourth Day of November 1980

[SEAL]

Attest:

SIDNEY A. DIAMOND

Attesting Officer

Commissioner of Patents and Trademarks